(12) United States Patent
Yang et al.

(10) Patent No.: US 10,952,160 B2
(45) Date of Patent: Mar. 16, 2021

(54) METHOD FOR INDICATING POWER HEADROOM REPORT, AND APPARATUS

(71) Applicant: HUAWEI TECHNOLOGIES CO., LTD., Guangdong (CN)

(72) Inventors: Yubo Yang, Shanghai (CN); Chao Luo, Shenzhen (CN); Zheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/030,720

(22) Filed: Jul. 9, 2018

(65) Prior Publication Data

US 2018/0317182 A1 Nov. 1, 2018

Related U.S. Application Data

(63) Continuation of application No. PCT/CN2017/070451, filed on Jan. 6, 2017.

(30) Foreign Application Priority Data

Jan. 9, 2016 (CN) .......................... 201610013432.5
Mar. 16, 2016 (CN) .......................... 201610148975.8

(51) Int. Cl.
*H04W 52/36* (2009.01)
*H04W 76/10* (2018.01)
(Continued)

(52) U.S. Cl.
CPC ......... *H04W 52/362* (2013.01); *H04W 24/10* (2013.01); *H04W 52/146* (2013.01);
(Continued)

(58) Field of Classification Search
CPC ............. H04W 52/362; H04W 52/365; H04W 52/146
See application file for complete search history.

(56) References Cited

U.S. PATENT DOCUMENTS

2009/0163211 A1* 6/2009 Kitazoe ............... H04W 74/004
455/436
2010/0093386 A1* 4/2010 Damnjanovic ....... H04W 52/04
455/522
(Continued)

FOREIGN PATENT DOCUMENTS

CN 101529831 A 9/2009
CN 102668412 A 9/2012
(Continued)

OTHER PUBLICATIONS

XP051080937 R1-161815 Huawei, HiSilicon,"Uplink power control",3GPP TSG RAN WG1 NB-IoT Ad-Hoc Meeting #2, Sophia-Antipolis, France, Mar. 22-24, 2016,total 5 pages.
(Continued)

*Primary Examiner* — Anh Vu H Ly
*Assistant Examiner* — Hector Reyes
(74) *Attorney, Agent, or Firm* — Leydig, Voit & Mayer, Ltd.

(57) ABSTRACT

Embodiments of the present disclosure disclose a method for determining a frequency resource, and an apparatus. The method includes: first determining, by user equipment (UE), a power headroom report; and subsequently sending, by the UE, the power headroom report (PHR) to a base station in a random access process, where the power headroom report may be carried by a related information segment of message 3 (Message 3) sent by the UE to the base station. According to the solutions provided in the present disclosure, a base station can obtain, in a timely manner, a basis for performing scheduling configuration when UE performs current uplink data transmission, and can more accurately configure power control and scheduling information for the UE. This avoids allocating the UE a channel that exceeds an uplink trans-
(Continued)

mission capability of the UE, and thereby avoids an uplink bandwidth waste.

6 Claims, 2 Drawing Sheets

(51) Int. Cl.
    *H04W 52/14* (2009.01)
    *H04W 76/27* (2018.01)
    *H04W 24/10* (2009.01)
    *H04W 74/08* (2009.01)
    *H04W 72/12* (2009.01)

(52) U.S. Cl.
    CPC ......... *H04W 52/365* (2013.01); *H04W 76/10* (2018.02); *H04W 76/27* (2018.02); *H04W 52/367* (2013.01); *H04W 72/1268* (2013.01); *H04W 74/0833* (2013.01)

(56) References Cited

U.S. PATENT DOCUMENTS

| | | | |
|---|---|---|---|
| 2011/0319112 A1* | 12/2011 | Jeong | H04W 52/146 455/509 |
| 2012/0257519 A1 | 10/2012 | Frank et al. | |
| 2013/0039314 A1* | 2/2013 | Prateek | H04W 74/08 370/329 |
| 2013/0044665 A1 | 2/2013 | Ng et al. | |
| 2013/0329673 A1 | 12/2013 | Kwon et al. | |
| 2014/0328326 A1 | 11/2014 | Gunnarsson et al. | |
| 2015/0126242 A1* | 5/2015 | Kim | H04W 52/34 455/522 |
| 2016/0302162 A1 | 10/2016 | Park et al. | |
| 2018/0249509 A1* | 8/2018 | Yi | H04W 48/18 |

FOREIGN PATENT DOCUMENTS

| | | |
|---|---|---|
| CN | 102918914 A | 2/2013 |
| CN | 103391609 A | 11/2013 |
| EP | 2663139 A1 | 11/2013 |
| JP | 2010508785 A | 3/2010 |
| JP | 2015505207 A | 2/2015 |
| WO | 2015034302 A1 | 3/2015 |

OTHER PUBLICATIONS

3GPP TS 36.321 V12.8.0 (Dec. 2015),3rd Generation Partnership Project;Technical Specification Group Radio Access Network;Evolved Universal Terrestrial Radio Access (E-UTRA);Medium Access Control (MAC) protocol specification (Release 12),77 pages.

3GPP TS 36.213 V13.0.0 (Dec. 2015),3rd Generation Partnership Project;Technical Specification Group Radio Access Network;Evolved Universal Terrestrial Radio Access (E-UTRA);Physical layer procedures(Release 13),326 pages.

3GPP TS 36.300 V12.8.0 (Dec. 2015),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 12),254 pages.

MediaTek Inc., Discussion on Preamble-based RA and Message-based RA for Rel-13 NB-IoT, 3GPP TSG-RAN WG1#83 R1-156990, Nov. 7, 2015, 5 pages.

\* cited by examiner

METHOD FOR INDICATING POWER HEADROOM REPORT, AND APPARATUS

CROSS-REFERENCE TO RELATED APPLICATIONS

This application is a continuation of International Application No. PCT/CN2017/070451, filed on Jan. 6, 2017, which claims priority to Chinese Patent Application No. 201610148975.8, filed on Mar. 16, 2016 and Chinese Patent Application No. 201610013432.5, filed on Jan. 9, 2016, The disclosures of the aforementioned applications are hereby incorporated by reference in their entireties.

TECHNICAL FIELD

The present disclosure relates to the field of mobile communications technologies, and to a method for indicating a power headroom report, and an apparatus.

BACKGROUND

Internet of Things (IoT) is "the Internet of connected things". IoT extends a user end of the Internet to any object, so that information exchange and communication can be performed between any object and another. Such a communication manner is also referred to as machine type communication (MTC), and a communications node is referred to as an MTC terminal. A typical application scenario of Internet of Things includes smart metering, smart household, and the like. Internet of Things needs to be applied to multiple scenarios, for example, an outdoor/indoor scenario and an overground/underground scenario. Therefore, many special requirements, for example, coverage enhancement, support for a large quantity of low-rate devices, low costs, and low energy consumption, are imposed on design of Internet of Things. To meet these special requirements, a new research project was approved on the $62^{nd}$ meeting of 3GPP GERAN to research into a method for supporting ultra low complexity and low-cost Internet of Things in a cellular network. With its relatively low costs and prominent coverage enhancement capability, a Narrowband Internet of Things (NB-IoT) solution was approved on the $69^{th}$ meeting of 3GPP RAN, and is standardized in R13 release.

In an existing Long Term Evolution (LTE) communications system, user equipment (UE) and a base station (eNodeB) frequently communicate with each other, the user equipment periodically reports a power headroom report to the base station, and the base station performs power control and scheduling on an important basis of the power headroom report reported by the user equipment. However, in an NB-IoT system, because user equipment has fewer services, if an existing power headroom report transmission mechanism in the LTE is reused, a base station cannot obtain a power headroom report (PHR) for current uplink data transmission performed by the user equipment, and therefore cannot perform scheduling and power control for the current uplink data transmission of the user equipment.

SUMMARY

Embodiments of the present disclosure disclose a method for indicating a power headroom report and an apparatus, so as to resolve a problem that a base station in an NB-IoT system cannot obtain a power headroom report of user equipment in a timely manner, and therefore cannot accurately configure scheduling information or power control information for the user equipment.

According to one aspect, an embodiment of this application provides a method for indicating a power headroom report (PHR), where the method is mainly used in a Narrowband Internet of Things (NB-IoT) system, and the method includes: first determining, by user equipment (UE), a power headroom report; and subsequently sending, by the UE, the power headroom report (PHR) to a base station in a random access process, where the power headroom report may be carried by a related information segment of a message (first message) sent by the UE to the base station.

In a possible design, the UE adds the PHR to message 3 in the random access process, where message 3 is used by the UE to establish a radio resource control (RRC) connection to the base station.

In a possible design, the power headroom report includes a difference value between an uplink power estimated by the UE and a maximum power of the UE.

In a possible design, the power headroom report may be a maximum subcarrier quantity supported by the UE, a subcarrier quantity set, or any value in the subcarrier quantity set. A bit quantity of information that needs to be sent may be reduced by indicating a subcarrier quantity set. For example, a set of supported subcarrier quantities is {1, 3, 6, 12}, and only two bits are required to indicate a subcarrier quantity that can be supported by a terminal.

In a possible design, the information segment is used to determine a status or an indication, which is used to instruct the UE to send the power headroom report to the base station. The UE sends a second message to the base station according to the status or the indication, and the second message includes the power headroom report.

In a possible design, before the UE sends the first message to the base station in message 3 in the random access process, the UE sends a random access preamble sequence to the base station.

In a possible design, the first message is a random access preamble sequence.

In a possible design, the information segment may be further used to determine another status or indication (second status), which is used to instruct the UE to send the power headroom report to the base station. The UE sends a third message to the base station according to the indication of the second status, and the third message includes the power headroom report.

According to another aspect, an embodiment of this application provides a method for receiving a power headroom report (PHR), where the method is mainly used in a Narrowband Internet of Things (NB-IoT) system and includes: receiving, by a base station, a message sent by UE, where the message carries power headroom report information, and the power headroom report information may be carried in message 3 sent by the UE to the base station in a random access process; after receiving the message sent by the UE, parsing, by the base station, the message to obtain a power headroom report; and determining, by the base station, scheduling information or power control information of the UE based on the power headroom report obtained by means of parsing.

According to still another aspect, an embodiment of the present disclosure provides UE, where the UE has a function of implementing UE behavior in the foregoing method design. The function may be implemented by hardware, or may be implemented by hardware by executing corresponding software. The hardware or the software includes one or more modules corresponding to the foregoing function. The modules may be software and/or hardware.

In a possible design, a structure of the UE includes a transmitter and a processor. The processor is configured to determine a power headroom report, and the transmitter is configured to send a message to a base station in message 3 in a random access process, where the message carries the power headroom report, and the power headroom report may be carried by a related information segment of a message (for example, message 3) sent by the UE to the base station.

According to yet another aspect, an embodiment of the present disclosure provides a base station, where the base station has a function of implementing base station behavior in the foregoing method design. The function may be implemented by hardware, or may be implemented by hardware by executing corresponding software. The hardware or the software includes one or more modules corresponding to the foregoing function.

In a possible design, a structure of the base station includes a processor and a receiver. The receiver is configured to receive a message sent by user equipment, where the message carries power headroom report information, and the power headroom report information may be carried in message 3 sent by the UE to the base station; and the processor parses the message to obtain a power headroom report, and determine scheduling information or power control information of the UE based on the power headroom report obtained by means of parsing.

According to still yet another aspect, an embodiment of the present disclosure provides a communications system, where the system includes the base station and the UE described in the foregoing aspect; or the system may include another network entity.

According to still yet another aspect, an embodiment of the present disclosure provides a computer storage medium, configured to store a computer software instruction used by the foregoing UE, and the computer storage medium includes a program designed for executing the foregoing aspect.

Compared with the prior art, in the solutions provided in the present disclosure, a base station can obtain, in a timely manner, a basis for performing scheduling configuration when UE performs current uplink data transmission, and can more accurately configure power control and scheduling information for the UE. This avoids allocating the UE a channel that exceeds an uplink transmission capability of the UE, and thereby avoids an uplink bandwidth waste.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description merely show some embodiments of the present disclosure, and persons of ordinary skill in the art can derive other implementations from these accompanying drawings without creative efforts. All these embodiments or implementations fall within the protection scope of the present disclosure.

DESCRIPTION OF EMBODIMENTS

Figure 1:
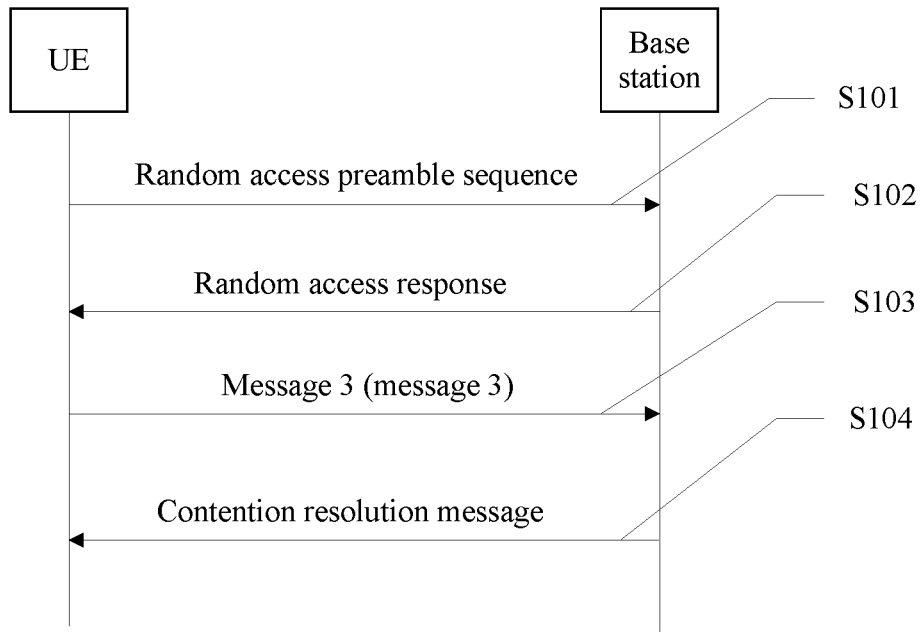
FIG. 1 is a flowchart of a method for indicating a power headroom report according to the present disclosure.

The following clearly describes the technical solutions according to embodiments of the present disclosure with reference to the accompanying drawings. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

A network architecture and a service scenario described in the embodiments of the present disclosure are used to describe the technical solutions in the embodiments of the present disclosure more clearly, but are not intended to limit the technical solutions provided in the embodiments of the present disclosure. Persons of ordinary skill in the art may understand that, with evolution of the network architecture and appearance of a new service scenario, the technical solutions provided in the embodiments of the present disclosure are also applicable to a similar technical problem.

In this application, terms "network" and "system" are usually interchangeably used, but meanings thereof may be understood by persons of ordinary skill in the art. User equipment UE in this application may include various handheld devices, in-vehicle devices, wearable devices, or computing devices that have a wireless communications function, or other processing devices connected to a wireless modem, and user equipment (UE), a mobile station (MS), a terminal, terminal equipment that are in various forms, and the like. For ease of description, in this application, all the devices mentioned above are referred to as user equipment or UE. A base station (BS) in the present disclosure is an apparatus that is deployed in a radio access network to provide a wireless communications function for the UE. The base station may include a macro base station, a micro base station, a relay node, an access point, and the like that are in various forms. In systems using different radio access technologies, a device having a base station function may have different names. For example, a device having a base station function is referred to as an evolved NodeB (eNB or eNodeB) in an LTE network, referred to as a NodeB in a 3rd Generation 3G network, or the like. For ease of description, in this application, all the foregoing apparatuses that provide a wireless communications function for the UE are referred to as a base station or a BS.

In LTE, user equipment (UE) sends a power headroom report (PHR) to a base station in the uplink direction, so that the base station performs scheduling and power control for the UE based on the PHR. The UE may periodically report the PHR to the base station, or may report the PHR when a specific condition is met, for example, report the PHR to the base station when a path loss change exceeds a specified threshold. The base station may further configure a minimum reporting period of the PHR to reduce signaling overheads, and the PHR is usually sent together with uplink data of the UE. The PHR reported by the UE is an important basis for performing uplink scheduling by the base station. The base station can avoid allocating the UE a channel that exceeds an uplink transmission capability of the UE, and thereby avoid an uplink bandwidth waste.

In an NB-IoT system, because UE has a small service volume, the UE usually sends uplink data only once each time the UE wakes up, and starts to send uplink data next time after a relatively long time interval. For example, user equipment such as a smart meter may usually send uplink data once every month or even a longer time. In this case, if a PHR trigger condition and a PHR sending method in LTE are reused, that is, an NB-IoT terminal sends a PHR in current data, a base station obtains no PHR in advance for current power control and scheduling for the UE and cannot perform power control and scheduling for the current uplink transmission of the UE. However, because of a relatively long time interval, a PHR obtained when the UE wakes up next time and sends uplink data to the base station cannot be used by the base station to perform power control and scheduling, and the base station lacks other corresponding auxiliary information for uplink data scheduling.

Therefore, as shown in FIG. 1, a method for indicating a PHR according to an embodiment of the present disclosure may be applied to an NB-IoT system. This method can resolve a problem that a base station in LTE cannot obtain a PHR as timely and then cannot perform power control and scheduling for UE. The following describes in detail a solution provided in this embodiment of the present disclosure with reference to FIG. 1. The method in this embodiment of the present disclosure is executed by a base station and UE, and may constitute an independent technical solution on either of a base station side and a UE side.

S101. The UE sends a random access preamble sequence to the base station.

A UE random access process may be generally a contention-based random access process or a contention free random access process.

In the contention-based random access process, the UE randomly selects a preamble sequence and sends the preamble sequence on a RACH channel. In the contention free random access process, during access, the UE uses a specific preamble sequence and PRACH resource that are provided by an eNodeB, and therefore does not contend with other UE, so as to ensure an access success rate.

S102. After receiving the random access preamble sequence sent by the UE, the base station sends a random access response to the UE in the downlink direction. The random access response usually includes the following information:
 a preamble sequence number;
 timing adjustment information; and
 location indication information of an uplink resource allocated to the UE.

In the contention-based random access process, the random access response may further include temporarily allocated cell radio network temporary identifier (C-RNTI) information.

S103. After receiving the random access response, the UE sends an uplink message on the uplink resource allocated by the base station to the UE. The uplink message carries a power headroom report (PHR). The UE sends message 3 in the uplink direction to initiate a radio resource control (RRC) connection establishment request to the base station.

The UE may add the PHR to message 3, and send the PHR to the base station by using message 3, so that the base station can perform uplink data scheduling control and power control for the UE according to the PHR. Before sending the PHR, the UE first determines content of the PHR carried in message 3. Generally, the content of the PHR is represented in the following manners:

1. The UE estimates uplink power of the UE and determines an estimated uplink power; and determines a difference value between the estimated uplink power and a maximum power of the UE and uses the determined difference value as the content representing the PHR. After obtaining the difference value, the UE reports the difference value to the base station. For example, there may be 64 indications, −23 dB to +40 dB, and the indication may be reduced according to a situation, so as to reduce a size of message 3.

2. The UE determines a subcarrier quantity that can be supported at a current uplink transmit power, and uses a value of the determined maximum subcarrier quantity as the content representing the PHR. The UE obtains the value of the maximum subcarrier quantity and reports the value to the base station.

Optionally, a value in a subcarrier quantity set may be indicated, so as to reduce a bit quantity of information that needs to be sent. For example, at least four bits are required for indication when there are 12 subcarriers, but if a subcarrier quantity set is used for indication, for example, {1, 4, 8, 12}, only two bits are required for indication.

In addition to the manners of adding the PHR content described above to message 3, another optional manner is as follows:

In message 2, an idle information indication bit or a newly-added information indication bit is used to determine that the UE sends the PHR or other auxiliary scheduling information to the base station under a specific condition. The information indication bit may be further used to determine an uplink resource on which the UE sends the foregoing information to the base station. Specific PHR content that is sent is described above, and is not described herein again.

The UE may also add the PHR to an uplink channel, and send the PHR to the base station by using the uplink channel, so that the base station can perform uplink data scheduling control and power control for the UE according to the PHR.

S104. The base station receives the uplink message of the UE, and sends message 4 to the UE to return contention resolution information.

In this embodiment, a PHR is carried in message 3 sent by UE to a base station, so that the base station can obtain, in a timely manner, a basis for performing scheduling configuration when the UE performs current uplink data transmission, and can more accurately configure power control and scheduling information for the UE. This avoids allocating the UE a channel that exceeds an uplink transmission capability of the UE, and thereby avoids an uplink bandwidth waste; or avoids allocating the UE bandwidth lower than that required by an uplink transmission capability required by the UE, and thereby avoids a loss of uplink transmission information of the UE.

An embodiment of the present disclosure provides another method for indicating a PHR. The following describes in detail a solution provided in this embodiment of the present disclosure with reference to FIG. 1. The method in this embodiment of the present disclosure is executed by a base station and user equipment, and may constitute an independent technical solution on either of a base station side and a UE side.

A difference between the method for indicating a PHR provided in this embodiment and the method in the foregoing embodiment is as follows:

Information indicating a PHR is carried in the random access preamble sequence sent by the UE to the base station in S101, instead of message 3 in the foregoing embodiment.

One or more information indication bits are determined in the random access preamble sequence and are used to determine that the UE sends the PHR or other auxiliary scheduling information to the base station under a specific condition. The information indication bit may be further used to determine an uplink resource on which the UE sends the foregoing information to the base station. This can be implemented by using a one-bit indication. For example, for a preamble sequence set {c_1, c_2, ..., c_n}, if the UE selects a sequence c_1 to c_n/2 as a preamble sequence, after receiving the preamble sequence, the base station considers that the UE sends 0; if the UE selects a sequence (c_n/2)+1 to c_n as a preamble sequence, after receiving the preamble sequence, the base station considers that the UE sends 1.

In this embodiment, information indicating a PHR is carried in a random access preamble sequence sent by UE to a base station, to indicate that the UE sends the PHR in the uplink direction under a specific condition, so that the base station can obtain, in a timely manner, a basis for performing scheduling configuration when the UE performs current uplink data transmission, and can more accurately configure power control and scheduling information for the UE. This avoids allocating the UE a channel that exceeds an uplink transmission capability of the UE, and thereby avoids an uplink bandwidth waste; or avoids allocating the UE bandwidth lower than that required by an uplink transmission capability required by the UE, and thereby avoids a loss of uplink transmission information of the UE.

Figure 2:
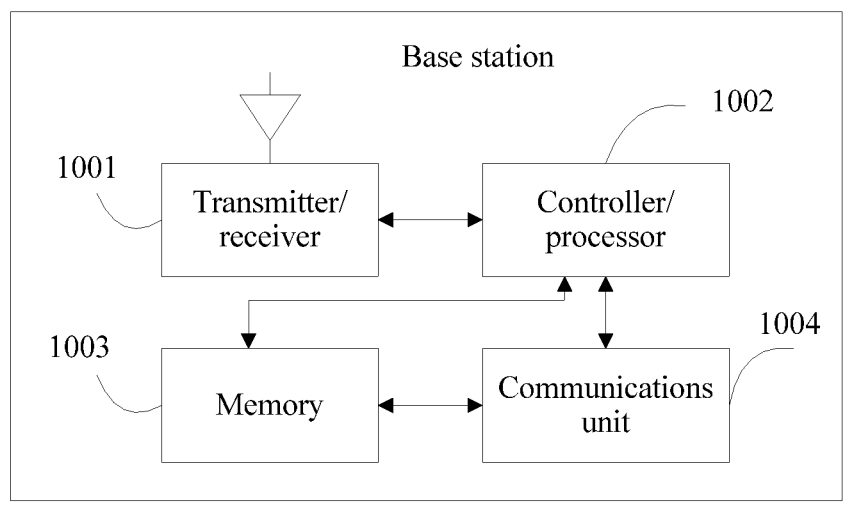
FIG. 2 is a schematic structural diagram of a base station that implements the present disclosure.

FIG. 2 shows a possible schematic structural diagram of a base station in the foregoing embodiment.

The base station includes a transmitter/receiver 1001, a controller/processor 1002, a memory 1003, and a communications unit 1004. The transmitter/receiver 1001 is configured to support information sending and receiving between the base station and the UE in the foregoing embodiment, and support radio communication between the base station and other UE. The controller/processor 1002 performs various functions for communicating with the UE. In an uplink, an uplink signal from the UE is received by an antenna, demodulated by the receiver 1001, and further processed by the controller/processor 1002, so as to restore service data and signaling information that are sent by the UE. In a downlink, service data and a signaling message are processed by the controller/processor 1002, and modulated by the transmitter 1001 to generate a downlink signal, and the downlink signal is sent by the antenna to the UE. The controller/processor 1002 further performs a processing process in FIG. 1 that includes the base station and/or is configured to perform another process of the technology described in this application. The memory 1003 is configured to store program code and data of the base station. The communications unit 1004 is configured to support communication between the base station and another network entity.

It may be understood that FIG. 2 shows merely a simplified design of a base station. In actual application, the base station may include any quantity of transmitters, receivers, processors, controllers, memories, communications units, and the like, and all base stations that can implement the present disclosure fall within the protection scope of the present disclosure.

Figure 3:
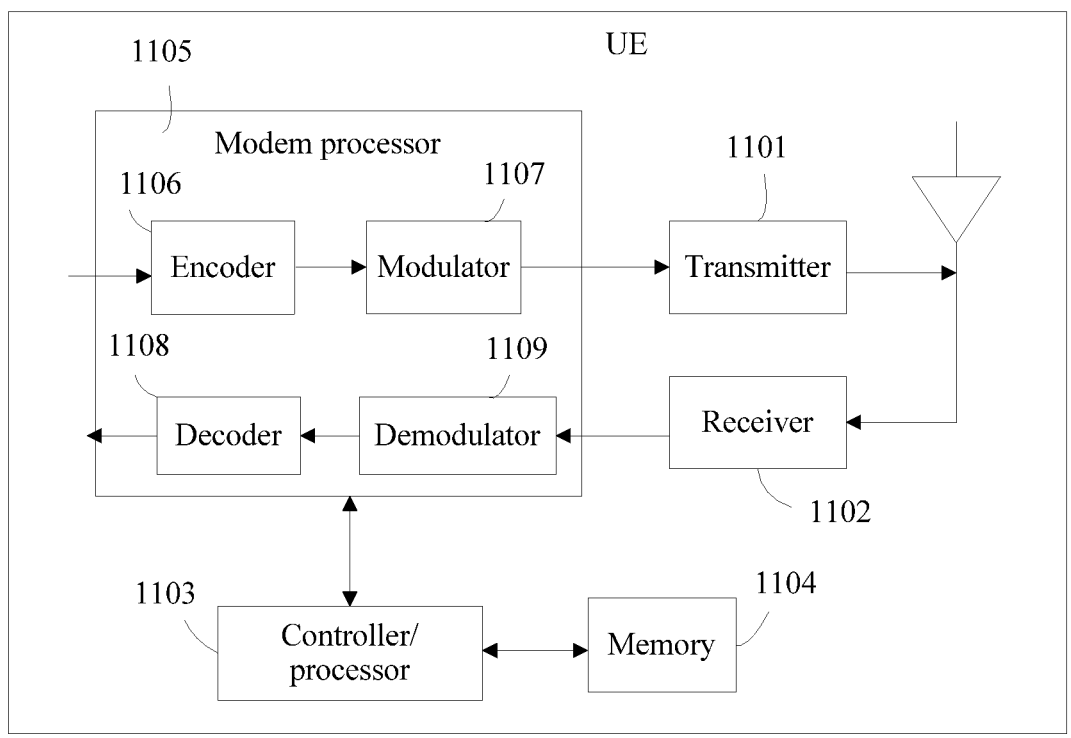
FIG. 3 is a schematic structural diagram of UE that implements the present disclosure.

FIG. 3 shows a simplified schematic diagram of a possible design structure of UE in the foregoing embodiment. The UE includes a transmitter 1101, a receiver 1102, a controller/processor 1103, a memory 1104, and a modem processor 1105.

The transmitter 1101 adjusts (for example, by means of analog conversion, filtering, amplification, and up-conversion) the output sampling and generates an uplink signal. The uplink signal is transmitted by using an antenna to the base station in the foregoing embodiment. In a downlink, the antenna receives a downlink signal transmitted by the base station in the foregoing embodiment. The receiver 1102 adjusts (for example, by means of filtering, amplification, down-conversion, and digitization) a signal received from the antenna and provides an input sampling. In the modem processor 1105, an encoder 1106 receives service data and a signaling message to be sent in an uplink, and processes (for example, by means of formatting, coding, and interleaving) the service data and the signaling message. A modulator 1107 further processes (for example, by means of symbol mapping and modulation) the encoded service data and signaling message, and provides an output sampling. A demodulator 1109 processes (for example, by means of demodulation) the input sampling and provides symbol estimation. A decoder 1108 processes (for example, by means of de-interleaving and decoding) the symbol estimation and provides the decoded data and signaling message that are sent to the UE. The encoder 1106, the modulator 1107, the demodulator 1109, and the decoder 1108 may be implemented by using the integrated modem processor 1105. These units perform processing according to a radio access technology (such as an access technology of LTE or another evolved system) used by a radio access network.

The controller/processor 1103 controls and manages an action of the UE, and is configured to perform processing performed by the UE in the foregoing embodiment. For example, the controller/processor 1103 is configured to control the UE to receive paging according to a received long DRX cycle and/or perform another process of the technology described in the present disclosure. For example, the controller/processor 1103 is configured to support performing, by the UE, a processing process in FIG. 1 that includes the UE, and/or is configured to perform another process of the technology described in this application. The memory 1104 is configured to store program code and data of the UE.

It should be noted that, in the foregoing embodiments, the descriptions of the embodiment have respective focuses. For a part that is not described in detail in an embodiment, refer to related descriptions in other embodiments. In addition, persons skilled in the art should also appreciate that all the embodiments described in the specification are embodiments, and the used actions and modules are not necessarily mandatory to the present disclosure.

A sequence of the steps of the method in the embodiments of the present disclosure may be adjusted, and the steps may be combined or reduced according to an actual requirement.

The modules in the embodiments of the present disclosure may be combined, divided, or reduced according to an actual requirement.

The controller/processor configured to perform functions of the base station, the UE, or the core network apparatus in the present disclosure may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor.

The steps of the method or the algorithm described with reference to content disclosed in the present disclosure may be implemented in a manner of hardware, or may be implemented in a manner of a processor performing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or any other well-known storage medium in the art. For example, a storage medium is coupled to a processor, so that the processor can read information from the storage medium or write information into the storage medium. Certainly, the storage medium may also be a component of the processor. The processor and the storage medium may be located in the ASIC. In addition, the ASIC may be located in user equipment. Certainly, the processor and the storage medium may exist in the user equipment as discrete components.

Persons skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A user equipment (UE), configured to indicate a power headroom report (PHR) in a Narrowband Internet of Things (NB-IoT) system, the UE comprising:
   a processor configured to determine the PHR; and
   a transmitter configured to send a first message to a base station in a random access process, wherein the first message comprises an information segment used for indicating the PHR,
   wherein the processor determines the PHR and the transmitter sends the first message to the base station as part of initiating communication with the base station in the NB-IoT system and in absence of a triggering condition requiring the UE to send the PHR to the base station,
   wherein the first message is message 3 in the random access process, wherein the message 3 is used to establish a radio resource control (RRC) connection between the UE and the base station,
   wherein the PHR comprises a maximum subcarrier quantity supported by the UE, and
   wherein the maximum subcarrier quantity supported by the UE is greater than one subcarrier and is represented by an individual value in the PHR.

2. The UE according to claim 1, wherein:
   the PHR comprises a difference value between an uplink power estimated by the UE and a maximum power of the UE.

3. A method for indicating a power headroom report (PHR) used in a Narrowband Internet of Things (NB-IoT) system, the method comprising:
   determining, by a user equipment (UE), the power headroom report (PHR); and
   sending, by the UE, a first message to a base station in a random access process, wherein the first message comprises an information segment, and the information segment is used for indicating the power headroom report,
   wherein the UE determines the PHR and sends the first message to the base station as part of initiating communication with the base station in the NB-IoT system and in absence of a triggering condition requiring the UE to send the PHR to the base station,
   wherein the first message is message 3 in the random access process, wherein the message 3 is used to establish a radio resource control (RRC) connection between the UE and the base station,
   wherein the PHR comprises a maximum subcarrier quantity supported by the UE, and
   wherein the maximum subcarrier quantity supported by the UE is greater than one subcarrier and is represented by an individual value in the PHR.

4. The method according to claim 3, wherein:
   the PHR comprises a difference value between an uplink power estimated by the UE and a maximum power of the UE.

5. The UE according to claim 1, wherein the first message is a random access preamble sequence.

6. The method according to claim 3, wherein the first message is a random access preamble sequence.

* * * * *